United States Patent [19]

Iida

[11] Patent Number: 5,235,141

[45] Date of Patent: Aug. 10, 1993

[54] LOAD CELL BALANCE

[75] Inventor: Yoshinori Iida, Shizuoka, Japan

[73] Assignee: Tokyo Electric Co., Ltd., Tokyo, Japan

[21] Appl. No.: 871,092

[22] Filed: Apr. 20, 1992

[30] Foreign Application Priority Data

Apr. 18, 1991 [JP] Japan ............................ 3-86484
Sep. 9, 1991 [JP] Japan ............................ 3-227830

[51] Int. Cl.[5] ........................................ G01G 21/24
[52] U.S. Cl. .................................................. 177/255
[58] Field of Search ............................ 177/255, 229

[56] References Cited

U.S. PATENT DOCUMENTS

| | | | |
|---|---|---|---|
| 4,278,139 | 7/1981 | Caris | 177/255 X |
| 4,585,083 | 4/1986 | Nishiguchi | 177/255 X |
| 4,657,097 | 4/1987 | Griffen | 177/229 X |
| 4,964,478 | 10/1990 | Stadler et al. | 177/255 X |
| 5,082,073 | 1/1992 | Stadler et al. | 177/255 X |

FOREIGN PATENT DOCUMENTS 62-3700 1/1987 Japan.

*Primary Examiner*—George H. Miller, Jr.
*Attorney, Agent, or Firm*—Oblon, Spivak, McClelland, Maier & Neustadt

[57] ABSTRACT

A load cell balance including a load cell and a scale frame connected to the load cell at a position offset from the center of the scale frame, so as to improve weighing accuracy and reduce a size of the balance. The scale frame is provided with a slit for making amounts of flexure of four corners of the scale frame equal to one another upon receiving of the same load, so that the amounts of flexure of the four corners of the scale frame having received the same load can be made equal to one another. Accordingly, the gap defined between the scale frame and each of four stoppers for limiting the amounts of flexure can be easily adjusted.

8 Claims, 6 Drawing Sheets

LOAD CELL BALANCE

FIELD OF THE INVENTION AND RELATED ART STATEMENT

The present invention relates to a load cell balance adapted to be used independently or as a component of an electronic charge balance or the like.

A load cell balance for detecting a weight of an article as an electrical data has lately been put to practical use. An example of the conventional load cell balance is shown in FIG. 10. A first end 2a of a load cell 2 is fixed to a rectangular base 1. A scale frame 3 is fixed to a second end 2b of the load cell 2. Four dampers 4 made of rubber are mounted at the four corners of the tray frame 3. A scale 5 is supported through the dampers 4 to the scale frame 3. Four stoppers 6 stand at the four corners of the base 1 so as to be vertically adjustable in height. The upper ends of the stoppers 6 are opposed to the lower surface of the scale frame 3 at the four corners thereof with a small gap defined therebetween. The load cell 2 is formed with a strain generating portion 2c between first end 2a and second end 2b. A strain gage (not shown) connected to a computing circuit (not shown) is attached to the strain generating portion 2c.

In such a structure, when an article is put on the tray 5, a load is applied through the scale frame 3 to the second end 2b of the load cell 2, and a strain is generated in the strain generating portion 2c of the load cell 2. As a result, a resistance of the strain gage attached to the strain generating portion 2c is changed, so that the weight of the article is calculated by the computing circuit according to a change in resistance. The result of calculation is transferred from the computing circuit to a display or a label printer (not shown), for example, and is subjected to desired displaying or printing. In weighing the article, the four corners of the scale frame 3 are slightly deformed by the applied load. An amount of deformation of the scale frame 3 at the four corners thereof is limited by the four stoppers 6 to prevent excess deformation of the scale frame 3 beyond its elastic limit. Accordingly, it is possible to avoid that the scale frame 3 will be plastically deformed or the load cell 2 will receive an excess load, thereby protecting the balance.

The strain of the strain generating portion 2c of the load cell 2 is generated with the application of a vertical load to the second end 2b of the load cell 2. Accordingly, in weighing the article, the moment about the first end 2a is generated in the load cell 2. This moment has an influence on the change in resistance of the strain gage, causing an error of the result of calculation. To cancel this moment, a connecting position of the scale frame 3 with respect to the second end 2b of the load cell 2 is offset from the center of the scale frame 3 as shown in FIG. 10. Therefore, when the vertical load is applied to the scale frame 3, the moment about the connecting position is generated in the scale frame 3 in the direction reverse to that of the moment generated in the load cell 2, so that the moment generated in the load cell 2 can be cancelled by the moment generated in the scale frame 3, to improve weighing accuracy.

In some load cell balances in the prior art, it is known that such offset connection of the scale frame with respect to the load cell is intended not to cancel the moment to be generated in the load cell but to make the balance compact or rationally arrange the parts in the balance.

However, in the conventional load cell balance having a structure such that the connecting position of the scale frame with respect to the load cell is offset from the center of the scale frame, an amount of deformation of the loaded scale frame at the two corners on the side near the connecting position is different from that at the other two corners on the side far from the connecting position. That is, in the load cell balance as shown in FIG. 10, when the same load is applied to the scale frame 3, an amount of deformation of the scale frame 3 at the two right corners is larger than that at the two left corners.

Accordingly, it is necessary to make an amount of adjustment of the stoppers 6 for limiting the amount of deformation of the scale frame 3 at the two right corners different from that at the two left corners. Such adjusting work is troublesome to reduce production efficiency of the balance.

In particular, the scale frame 3 is conventionally manufactured by an aluminum die casting method, and it is formed of an aluminum alloy into a rectangular shape having lightening holes 7 as shown in FIG. 11 or an X-shape as shown in FIG. 12. However, the scale frame 3 formed of an aluminum alloy is required to have a thickness enough to maintain necessary strength, so that an amount of flexure of the scale frame 3 is small. As a result, the gap to be defined between the scale frame 3 and each stopper 6 must be made very small, and accordingly fine adjustment of the stoppers 6 is required, making the adjusting work for the stoppers 6 more troublesome.

Further, the use of the scale frame 3 formed of an aluminum alloy having a large thickness causes an increase in size of the balance. In addition, the manufacturing of the scale frame 3 by the aluminum die casting method requires making of a die, causing an increase in manufacturing cost and manufacturing time.

To cope with this disadvantage, it is also conventionally carried out that the scale frame 3 is formed by bending or drawing a steel plate. The scale frame 3 formed of a steel plate can maintain a sufficient strength even though a thickness of the steel plate is made small, so that the size of the balance can be made small. FIG. 13 shows an example of the scale frame 3 formed by bending a steel plate. However, the bending of a steel plate causes a variation in products. Further, it is difficult to generate a uniform stress over the scale frame 3 upon application of a load thereto, causing a reduction in weighing accuracy of the load cell 2.

OBJECT AND SUMMARY OF THE INVENTION

It is a first object of the present invention to make it easy to adjust a gap defined between a scale frame and each stopper.

It is a second object of the present invention to weigh an article with high accuracy without being influenced by moment.

It is a third object of the present invention to enlarge the gap defined between the scale frame and each stopper, thereby making adjusting work easier.

It is a fourth object of the present invention to make it easy to manufacture the scale frame.

There is provided a load cell balance comprising: a load cell fixed at a first end thereof to a base; a tray for placing an article thereon; a scale frame formed at four corners thereof with four supporting portions for supporting the scale, the scale frame being connected to an upper end of the load cell at a position offset from the center of the scale frame; and four stoppers standing at four corners of the base so as to be opposed to a lower surface of the scale frame at the four corners thereof with a predetermined gap defined; wherein the scale frame is formed with a slit for making amounts of flexure of the four corners of the scale frame equal to one another upon receiving of the same load. Accordingly, when the article is placed on the tray, a load is applied through the scale frame to the second end of the load cell, and a strain is generated in a strain generating portion of the load cell, thus electrically weighing the article. In weighing the article, the scale frame is flexed by the applied load, and the amounts of flexure of the four corners of the scale frame are made equal to one another by the slit formed through the scale frame. Accordingly, in adjusting the gap defined between the scale frame and each stopper, the amounts of adjustment of all the gaps for the four stoppers can be made equal to one another, thereby making the adjustment easy.

The connecting position of the scale frame with respect to the load cell is set so that moment to be generated in the load cell may be balanced to moment to be generated in the scale frame. Accordingly, the moment to be generated in the load cell by the load applied to the scale can be cancelled by the moment to be generated in the scale frame, so that the article can be weighed with high accuracy in the load cell without being influenced by the moment.

The scale frame is formed of a flat steel plate. Accordingly, the scale frame can be made thin with a sufficient strength of the steel plate, thereby enlarging an amount of flexure of the scale frame with application of a load thereto. Therefore, the gap defined between the scale frame and each stopper can be enlarged to some extent, thereby making the adjusting work of the stoppers easy. Further, as the thickness of the scale frame is small, the size of the balance can be small. Moreover, the scale frame is manufactured by punching a steel plate into a desired shape, thereby reducing a manufacturing cost and a manufacturing time. Additionally, as the scale frame is formed flat, the variation in manufacturing can be made very small, and a stress to be generated in the scale frame with application of a load thereto can be made uniform to thereby improve the weighing accuracy.

DETAILED DESCRIPTION OF THE PREFERRED EMBODIMENTS

Figure 1:
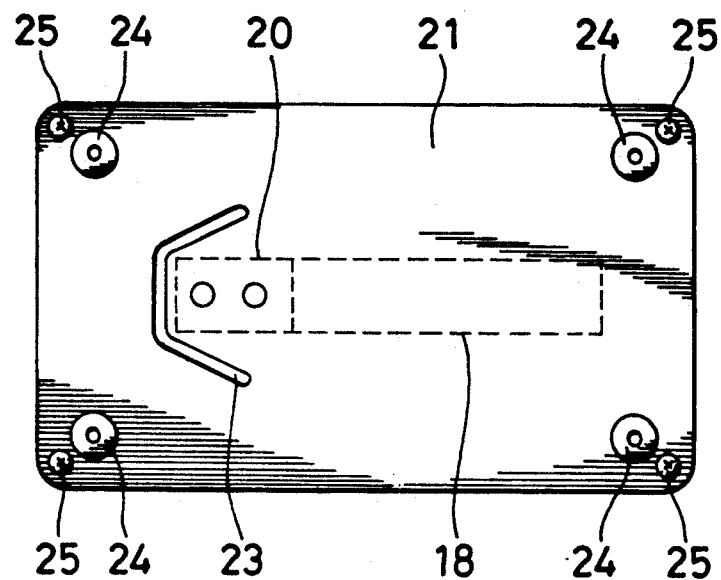
FIG. 1 is a plan view of a scale frame to be used in a load cell balance according to a preferred embodiment of the present invention.

A preferred embodiment of the present invention will now be described with reference to FIGS. 1 to 9. FIG. 2 shows a general external construction of a load cell balance according to the preferred embodiment. Four legs 10 made of rubber or plastic are mounted on a lower surface of a base 11 at four corners thereof. A box-shaped body case 12 having a lower opening is mounted on the base 11. A tray 13 is provided above an upper surface of the body case 12. A keyboard 14 is provided on a front surface of the body case 12, and a pair of handling recesses 15 are formed on opposite side surfaces of the body case 12.

Figure 2:
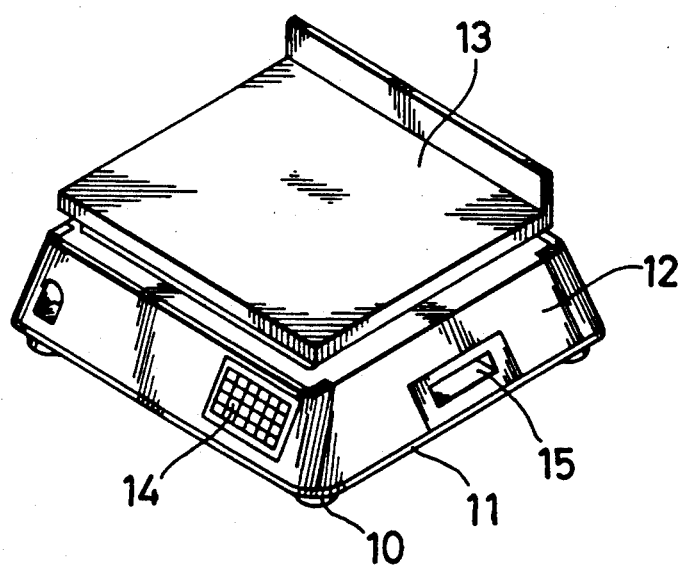
FIG. 2 is a perspective view of the load cell balance.
Figure 3:
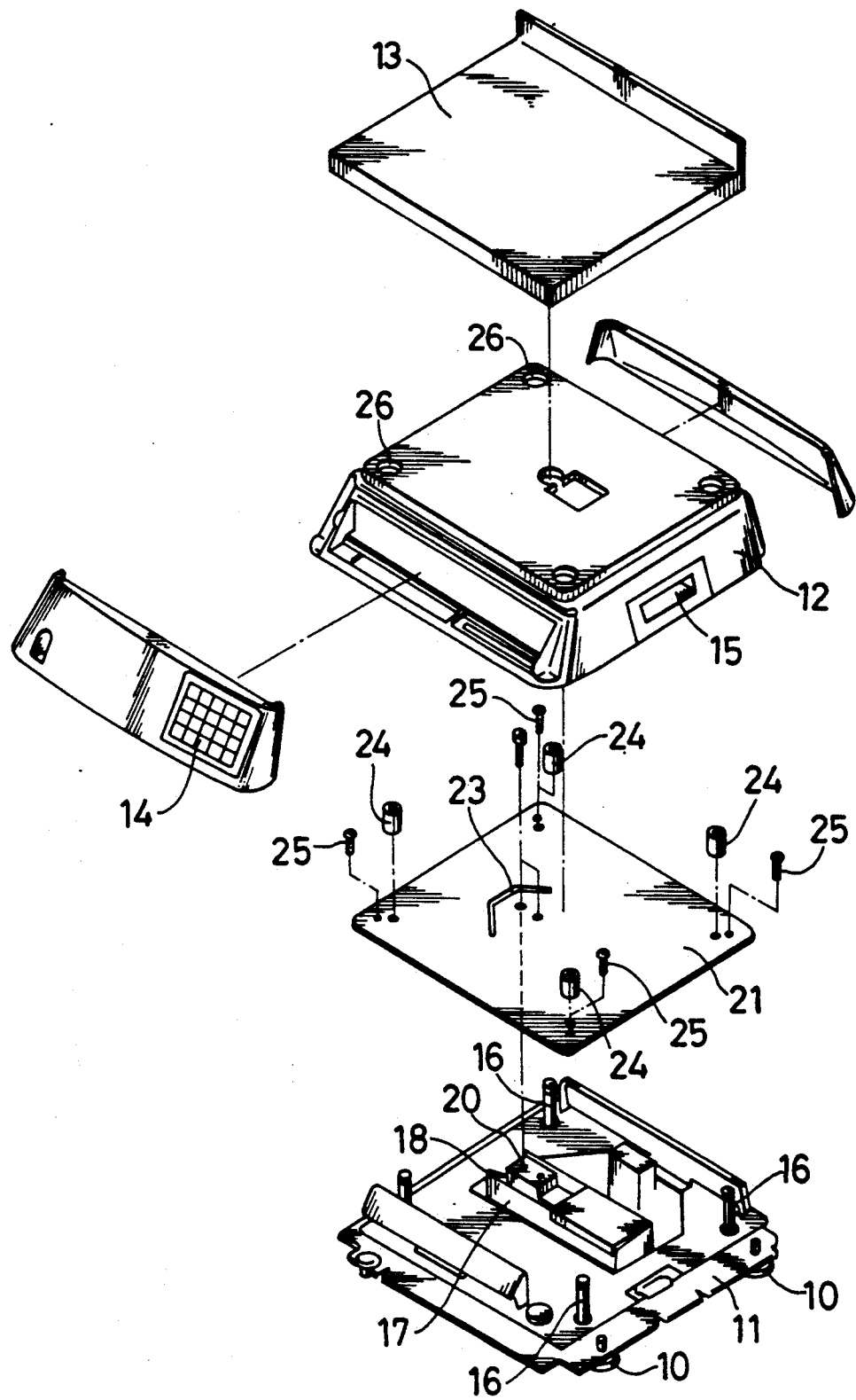
FIG. 3 is an exploded perspective view of the load cell balance.
Figure 4:
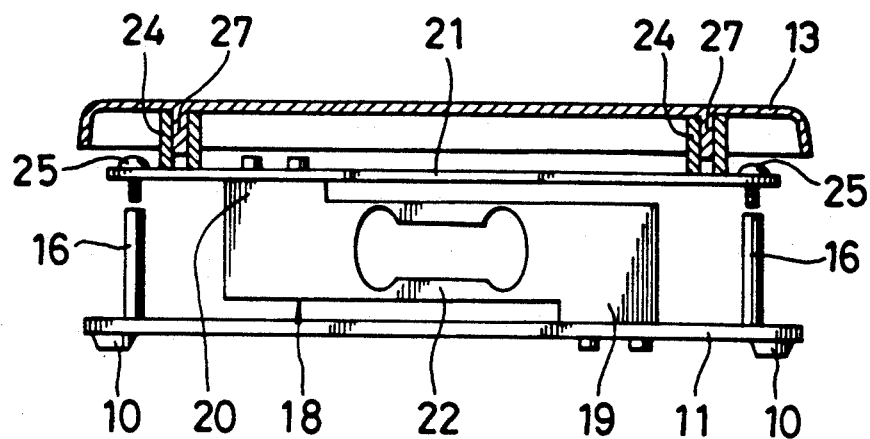
FIG. 4 is a vertically sectional side view of the load cell balance with a body case omitted.

An internal structure of the load cell balance is shown in FIGS. 1, 3 and 4. Four stoppers 16 having the same height stand on an upper surface of the base 11 at the four corners thereof. A load cell 18 is located at a central portion of the base 11 so as to be surrounded by a shield plate 17, and a first end 19 of the load cell 18 is fixed to the upper surface of the base 11 by means of screws. A scale frame 21 is fixed to a second end 20 of the load cell 18 by means of screws. As apparent from FIG. 4, the scale frame 21 is connected to the load cell 18 at a position offset from the center of the scale frame 18, and the center of the scale frame 18 is positioned on a vertical center line of a strain generating portion 22 of the load cell 18.

The scale frame 21 is formed by punching a rolled steel plate into a rectangular flat member. The scale frame 21 is formed with a slit 23 having a predetermined shape in the vicinity of the connecting position with respect to the load cell 18. The shape of the slit 23 is so determined as to make the amounts of flexure of the four corners of the scale frame 21 equal to one another upon receiving of the same load. In this preferred embodiment, the slit 23 is formed in a hook-shape such that it divides two segments connecting the above-mentioned connecting position to the two corners of the scale frame 21 on the left side as viewed in FIG. 4.

Four cylindrical dampers 24 made of rubber as supporting members for supporting the scale 13 are mounted on the upper surface of the scale frame 21 at the four corners thereof. Furthermore, four adjusting screws 25 are threadedly engaged with the scale frame 21 so as to project downwardly from the lower surface of the scale frame 21 and be opposed to the four stoppers 16, respectively. The body case 12 to be mounted on the base 11 is provided with four insert holes 26 for respectively inserting the four dampers 24 therethrough under a non-contact condition. The scale 13 is provided with four projections 27 adapted to be respectively inserted into the four dampers 24. Thus, the scale 13 is supported to the scale frame 21 by respectively inserting the four projections 27 of the scale 13 into the four dampers 24 mounted on the scale frame 21 and inserted through the insert holes 26 of the body case 12.

In operation, when an article to be weighed is placed on the tray 13, a vertical load is applied through the scale frame 21 to the second end 20 of the load cell 18, and a strain is accordingly generated in the strain generating portion 22 of the load cell 18. As a result, a strain gage (not shown) attached to the strain generating portion 22 is expanded to change resistance. According to this change in resistance, the weight of the article is calculated by a computing circuit (not shown). In weighing the article, the amounts of flexure of the four corners of the scale frame 21 flexed by the applied load are limited by the four stoppers 16, thereby preventing plastic deformation of the scale frame 21 to protect the balance.

When the vertical load is applied to the second end 20 of the load cell 18, the moment about the first end 19 is generated in the load cell 18. On the other hand, the scale frame 21 is connected to the load cell 18 at the position offset from the center of the scale frame 21, and the center of the scale frame 21 is positioned on the vertical center line of the strain generating portion 22 of the load cell 18. Accordingly, the moment about the connecting position is generated in the scale frame 21 in such a manner that the magnitude of the moment is the same as that of the moment generated in the load cell 18 and the direction of the moment is reverse to that of the moment generated in the load cell 18. As a result, the moment generated in the load cell 18 is cancelled by the moment generated in the scale frame 21, so that the influence of the moment against an output from the load cell 18 is eliminated, to thereby improve weighing accuracy.

Furthermore, while the four corners of the scale frame 21 are flexed by the load applied by the tray 13 on which the article is placed, the amounts of flexure of the four corners of the scale frame 21 are equal to one another. That is, the scale frame 21 is provided with the slit 23 having such a shape that the two segments connecting the two corners of the scale frame 21 on the side of the offset connecting position to the connecting position of the scale frame 21 with respect to the load cell 18 are divided, to thereby make the amounts of flexure of the four corners of the scale frame 21 equal to one another upon receiving of the same load. Accordingly, the amounts of adjustment of the adjusting screws 25 with respect to the four corners 16 for limiting the amounts of flexure of the four corners of the scale frame 21 can be made equal to one another, thereby making it easy to adjust the gap between the scale frame 21 and each stopper 16 to contribute to the improvement in production efficiency of the balance.

Moreover, as the scale frame 21 is formed of a steel plate, a sufficient strength of the scale frame 21 can be maintained in spite of a small thickness of the steel plate. Accordingly, the scale frame 21 can be made thin. In the scale frame 21 having a small thickness, the amount of flexure of the scale frame 21 within its elastic limit can be made relatively large, so that the gap between the scale frame 21 and each stopper 16 can be set wide to some extent. Accordingly, no precision is required for the adjustment of the gap between the scale frame 21 and each stopper 16. Thus, the adjustment of the gap can be made easier.

And further, the small thickness of the scale frame 21 may contribute to a reduction in size of the balance. Additionally, as the scale frame 21 may be manufactured by simply punching a rolled steel plate into a desired shape without the need of any dies or the like, a manufacturing cost can be reduced and a manufacturing time can be shortened.

Moreover, as the scale frame 21 is formed flat, a variation in forming the scale frame 21 can be reduced, and a stress to be generated in the scale frame 21 with application of the load thereto can be made uniform over the scale frame 21. Accordingly, the weighing accuracy in the load cell 18 can be improved.

Figure 5:
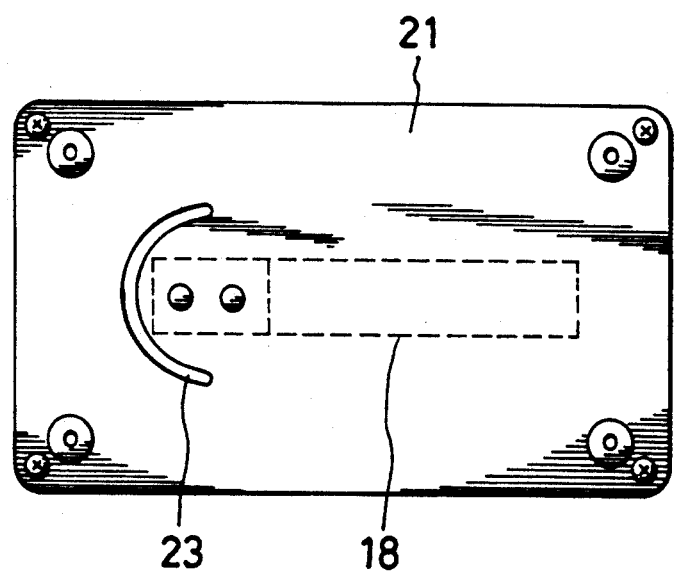
FIG. 5 is a plan view illustrating a first modification of a slit to be formed through the scale frame.

FIG. 5 shows a first modification of the slit 23. In this modification, the slit 23 is formed in a semicircular shape.

Figure 6:
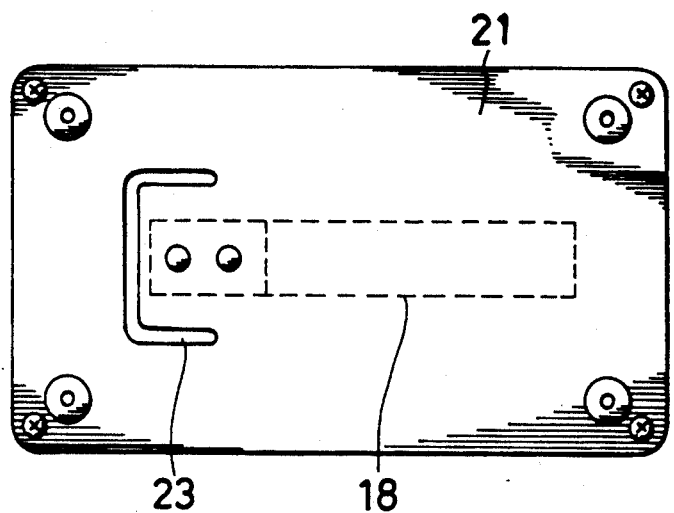
FIG. 6 is a plan view illustrating a second modification of the slit.

FIG. 6 shows a second modification of the slit 23. In this modification, the slit 23 is formed in a U-shape.

Figure 7:
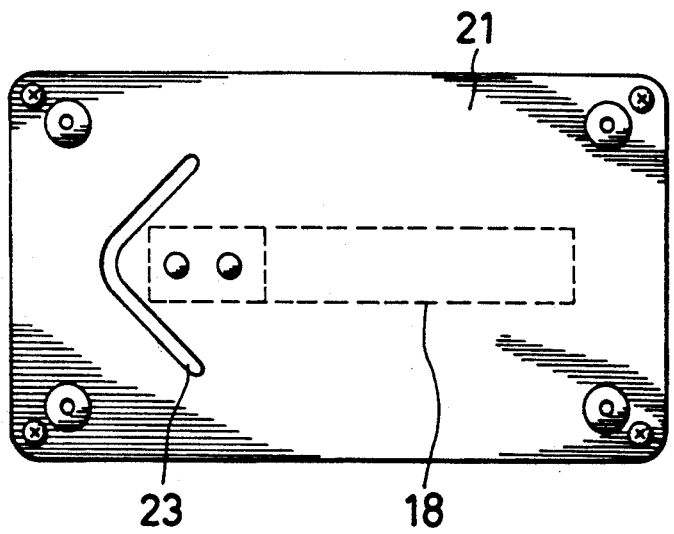
FIG. 7 is a plan view illustrating a third modification of the slit.

FIG. 7 shows a third modification of the slit 23. In this modification, the slit 23 is formed in a V-shape.

Figure 8:
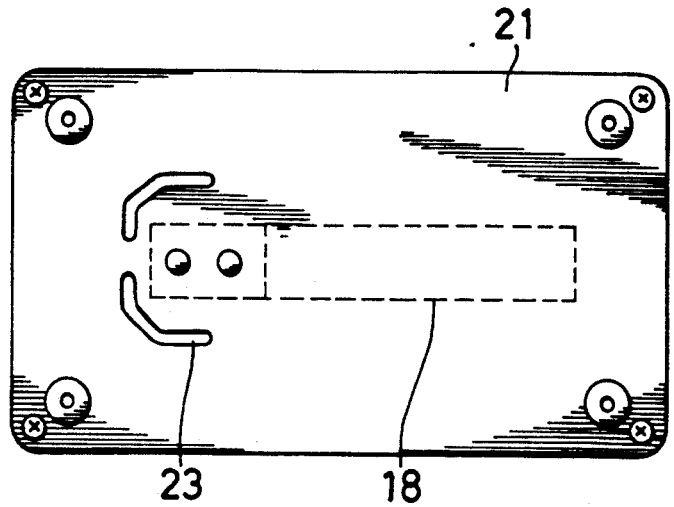
FIG. 8 is a plan view illustrating a fourth modification of the slit.

FIG. 8 shows a fourth modification of the slit 23. In this modification, the slit 23 is constituted of a pair of separate slits each having substantially the same shape as that shown in FIG. 1.

Figure 9:
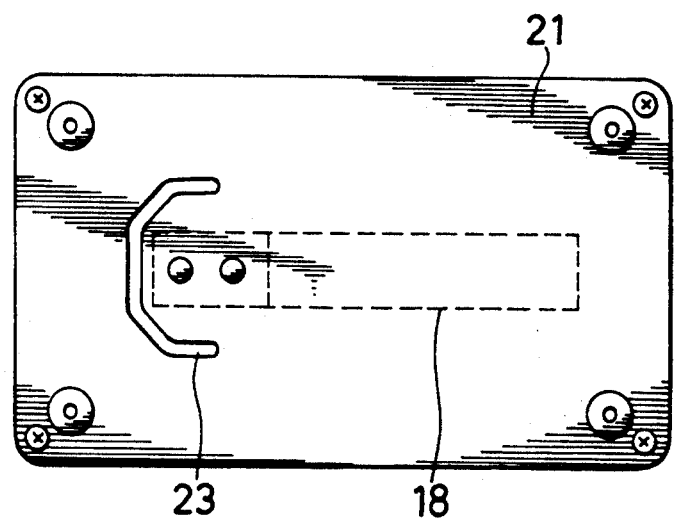
FIG. 9 is a plan view illustrating a fifth modification of the slit.
Figure 10:
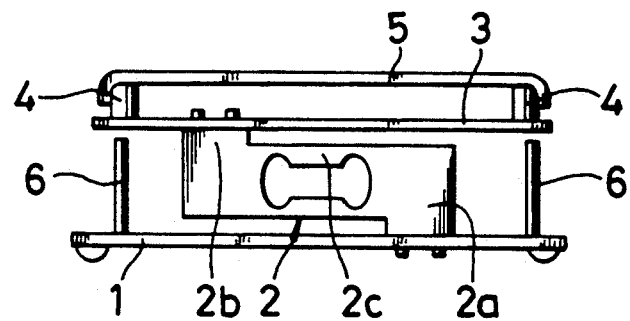
FIG. 10 is a side view of an example of a conventional load cell balance with a body case omitted.
Figure 11:
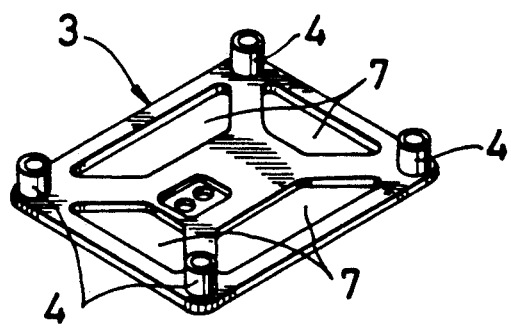
FIG. 11 is a perspective view of an example of a scale frame to be used in the conventional load cell balance.
Figure 12:
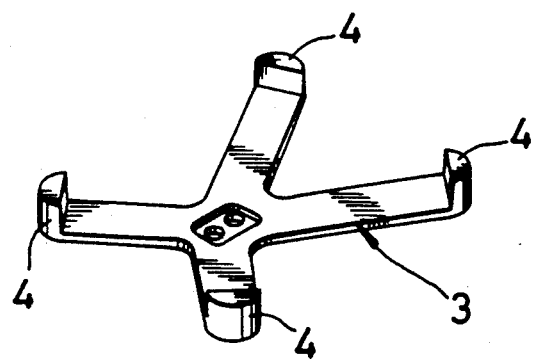
FIG. 12 is a perspective view of another example of the scale frame in the prior art.
Figure 13:
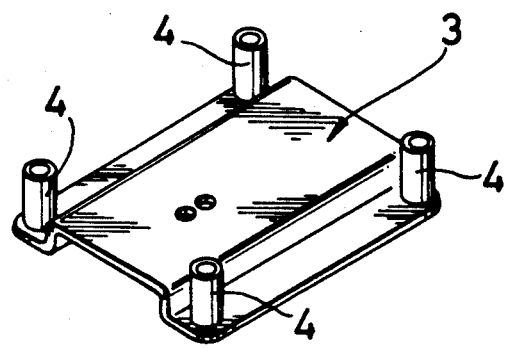
FIG. 13 is a perspective view of a further example of the scale frame in the prior art.

FIG. 9 shows a fifth modification of the slit 23. In this modification, the slit 23 is formed by connecting the two slits shown in FIG. 8.

It is to be noted that the various shapes of the slit 23 shown in FIGS. 1 and 5 to 9 are merely illustrative and not limitative. Further, in addition to the slit 23, another slit may be formed between the connecting position of the scale frame 21 with respect to the load cell 18 and the other two corners of the scale frame 21 on the side far from the connecting position.

According to the invention the scale is supported to the scale frame at the four corners thereof, and the scale frame is connected to the second end of the load cell at a position offset from the center of the scale frame. The scale frame is provided with a slit for making amounts of flexure of the four corners of the scale frame equal to one another upon receiving of the same load. Accordingly, the amounts of flexure of the four corners of the scale frame upon receiving of the same load can be made equal to one another by the slit. Accordingly, the amounts of adjustment of all the gaps between the scale frame and the four stoppers for limiting the amounts of flexure of the four corners of the scale frame can be made equal to one another, thereby making the adjusting work of the stoppers easy to contribute to the improvement in production efficiency of the load cell balance.

The connecting position of the scale frame with respect to the load cell in the invention can be set so that moment to be generated in the load cell may be balanced to moment to be generated in the scale frame. Accordingly, the moment to be generated in the load cell by the load applied to the scale can be cancelled by the moment to be generated in the scale frame, so that the article can be weighed with high accuracy in the load cell without being influenced by the moment, thus improving the weighing accuracy.

The the scale frame in the invention as defined in claim 1 can be formed of a flat steel plate. Accordingly, the scale frame can be made thin with a sufficient strength of the steel plate, thereby enlarging an amount of flexure of the scale frame within its elastic limit with application of a load thereto. Therefore, the gap defined between the scale frame and each stopper can be enlarged to some extent, thereby making the adjusting work of the stoppers easy. Furthermore, as the thickness of the scale frame is small, the size of the balance can be small. Moreover, the scale frame is manufactured by punching a steel plate into a desired shape without the need of any dies or the like, thereby reducing a manufacturing cost and a manufacturing time. And further, as the scale frame is formed flat, the variation in manufacturing can be made very small, and a stress to be generated in the scale frame with application of a load thereto can be made uniform, to thereby improve the weighing accuracy.

What is claimed is:

1. A load cell balance comprising:

a load cell having a first fixed end, a second end for receiving a vertical load, and a strain generating portion formed between the first end and the second end for generating a strain upon receiving of the vertical load;

a tray for placing an article thereon;

a rectangular scale frame formed at four corners thereof with four supporting portions for supporting said tray, said scale frame being connected to the second end of said load cell at a position offset from the center of said scale frame; and four stoppers opposed to a lower surface of said scale frame at the four corners thereof with a predetermined gap defined;

wherein said scale frame is provided with a slit for making amounts of flexure of the four corners of said scale frame equal to one another when a same load is applied to each corner with the other corners empty.

2. The load cell balance as defined in claim 1, wherein the connecting position of said scale frame with respect to said load cell is set so that the moment to be generated in said load cell may be balanced to the moment to be generated in said scale frame.

3. The load cell balance as defined in claim 2, wherein the center of said scale frame is positioned on the vertical center line of the strain generating portion of said load cell.

4. The load cell balance as defined in claim 1, wherein said scale frame is formed of a flat steel plate.

5. The load cell balance as defined in claim 4 wherein said scale frame is formed by punching.

6. The load cell balance as defined in claim 1 further comprising a base provided under said load cell, said first end of said load cell being fixed to said base.

7. The load cell balance as defined in claim 6, wherein said four stoppers stand on said base.

8. The load cell balance as defined in claim 1 further comprising a base for fixing said first end of said load cell, said four stoppers being provided on said base.

* * * * *